United States Patent
Choi et al.

(10) Patent No.: US 8,265,204 B2
(45) Date of Patent: Sep. 11, 2012

(54) DECODING DEVICE AND METHOD FOR MIMO SYSTEM

(75) Inventors: Eun-Young Choi, Daejeon (KR); Chan Ho Yoon, Daejeon (KR); Jung Bo Son, Daejeon (KR); Hun Sik Kang, Daejeon (KR); Sok-Kyu Lee, Daejeon (KR); Seok Hyun Yoon, Gwangmyeong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 319 days.

(21) Appl. No.: 12/602,353

(22) PCT Filed: May 19, 2008

(86) PCT No.: PCT/KR2008/002790
§ 371 (c)(1),
(2), (4) Date: Nov. 30, 2009

(87) PCT Pub. No.: WO2008/147067
PCT Pub. Date: Dec. 4, 2008

(65) Prior Publication Data
US 2010/0189200 A1    Jul. 29, 2010

(30) Foreign Application Priority Data

May 31, 2007   (KR) .................. 10-2007-0053208
Sep. 14, 2007   (KR) .................. 10-2007-0093558

(51) Int. Cl.
*H04L 27/06* (2006.01)
(52) U.S. Cl. .................. 375/340; 375/341; 375/262

(58) Field of Classification Search .......... 375/259–260, 375/262, 265, 340–341, 347–348, 346, 285, 375/267
See application file for complete search history.

(56) References Cited

U.S. PATENT DOCUMENTS 5,867,531 A * 2/1999 Shiino et al. ................. 375/262
7,369,511 B2 * 5/2008 Utsunomiya et al. ........ 370/252

(Continued)

FOREIGN PATENT DOCUMENTS

KR   10-2007-0010139   1/2007

(Continued)

OTHER PUBLICATIONS

Wen Jiang, et al., "Bi-Truncation for Simplified MIMO Signal Detection," Globecome 2004, vol. 1, Nov. 29-Dec. 3, 2004, pp. 401-405.

(Continued)

*Primary Examiner* — Jean B Corrielus
(74) *Attorney, Agent, or Firm* — Staas & Halsey LLP (57) ABSTRACT

The present invention relates to a decoding device and method for a MIMO system. A linear process is applied to a received signal vector by using a channel matrix estimated from the received signal vector and a poly-diagonalized matrix, and a soft decision value is acquired through a trellis decode by using the linear process result. Since the linear preprocess is performed by using the poly-diagonalized matrix, it is possible to receive a MIMO signal having good packet error rate performance and less complexity. Also, since the tail-biting trellis decoding method is used based on the poly-diagonalized matrix that is generated by poly-diagonalizing the effective channel matrix during the process for eliminating the signal interference, the soft decision value for the symbol can be generated with a simple hardwired device and less operation complexity.

15 Claims, 6 Drawing Sheets

U.S. PATENT DOCUMENTS

| | | | |
|---|---|---|---|
| 7,460,581 B2 * | 12/2008 | Serratore et al. | 375/146 |
| 7,620,114 B2 | 11/2009 | Takano | |
| 7,876,839 B2 * | 1/2011 | Dong et al. | 375/260 |
| 7,881,247 B2 * | 2/2011 | Pan et al. | 370/319 |
| 7,907,912 B2 * | 3/2011 | Nam et al. | 455/69 |
| 8,014,267 B2 * | 9/2011 | Boer et al. | 370/208 |
| 8,031,762 B2 * | 10/2011 | Vijayan et al. | 375/229 |
| 2003/0179733 A1 | 9/2003 | Yano | |
| 2004/0001564 A1 | 1/2004 | Chan et al. | |
| 2004/0052315 A1 * | 3/2004 | Thielecke et al. | 375/299 |
| 2004/0170233 A1 * | 9/2004 | Onggosanusi et al. | 375/340 |
| 2005/0271121 A1 * | 12/2005 | Serratore et al. | 375/146 |
| 2007/0086549 A1 | 4/2007 | Kim et al. | |
| 2007/0253479 A1 * | 11/2007 | Mukherjee | 375/240.1 |
| 2008/0092025 A1 * | 4/2008 | Hedayat et al. | 714/792 |
| 2010/0104039 A1 * | 4/2010 | Ketchum et al. | 375/267 |
| 2010/0195630 A1 * | 8/2010 | Sutivong et al. | 370/336 |
| 2010/0215115 A1 * | 8/2010 | Ketchum et al. | 375/267 |
| 2011/0243284 A1 * | 10/2011 | Ghosh | 375/346 |

FOREIGN PATENT DOCUMENTS

| | | |
|---|---|---|
| KR | 10-2007-0039285 | 4/2007 |
| WO | WO 00/13386 | 3/2000 |
| WO | WO 00/25447 | 5/2000 |
| WO | WO 2004/064298 | 7/2004 |

OTHER PUBLICATIONS

Seokhyun Yoon, et al., "A Detection Algorithm for Multi-Input Multi-Output (MIMO) Transmission using Poly-Diagonalization and Trellis Decoding," Proc. of Wireless Communications and Networking Conference (WCNC), Mar. 31, 2008.

* cited by examiner

DECODING DEVICE AND METHOD FOR MIMO SYSTEM

CROSS REFERENCE TO RELATED APPLICATIONS

This application is a 371 of and claims the benefit of International Application No. PCT/KR2008/002790, filed May 19, 2008, and claims the benefit of Korean Application No. 10-2007-0053208, filed May 31, 2007, and Korean Application No. 10-2007-0093558, filed Sep. 14, 2007, the disclosures of all of which are incorporated herein by reference.

BACKGROUND OF THE INVENTION (a) Field of the Invention

The present invention relates to a decoding method and device, and in particular, it relates to a decoding device and method for a multi-input multi-output system.

This work was supported by the IT R&D program of MIC/IITA. [2006-S-014-02, Development of IEEE 802.11n Modem & RF Chip-sets with Data Rate 200 Mbps].

(b) Description of the Related Art

The multi-input multi-output (MIMO) system is a core technique for the wireless digital communication system, and a plurality of corresponding transmitting/receiving schemes have been researched. In general, a method for a transmission part to process signals includes the Bell Labs layered space time (BLAST) method, and a receiving method for a receiving part to process signals includes a linear detection method and a nonlinear detection method.

The linear detection method includes the zero forcing (ZF) method and the minimum mean square error (MMSE) method. Also, the nonlinear detection method includes the maximum likelihood (ML) detection method and the successive interference cancellation (SIC) method.

Regarding the nonlinear detection methods, the ML method improves performance by inputting symbols that are transmittable by transmit antennas and selecting the input that has the minimum square Euclidean distance. However, the ML method exponentially increases complexity according to the number of transmit antennas and the order of modulation.

Also, the SIC method increases performance by detecting and eliminating a channel that has a great signal to interference plus noise ratio (SINR). However, an ordering process for acquiring the best performance is required so as to use the SIC method.

In the theoretical information viewpoint, the SIC method is the best receiving algorithm for achieving channel capacity, but it requires a large amount of decoding delay since it needs to perform sequential interference cancellation. Further, the ML method generates good performance for the frame error rate, but it is difficult to apply to a real receiver because of its great operation complexity.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a decoding device and method having advantages of generating great packet error rate performance while reducing complexity of a receiver.

In one aspect of the present invention, a decoding device includes: a demultiplexer for demultiplexing a received signal including a pilot and a data symbol, and outputting the pilot and the data symbol; a channel estimator for receiving the pilot from the demultiplexer, estimating a channel of the received signal, and outputting a channel matrix; and a multi-input multi-output (MIMO) decoder for outputting a received signal vector from the data symbol provided by the demultiplexer, and generating a soft decision value based on the received signal vector, wherein the MIMO decoder includes a linear process module for outputting the received signal vector from the data symbol that is output by the demultiplexer by using a poly-diagonalized matrix corresponding to the channel matrix estimated by the channel estimator, and a decoding module for generating a soft decision value for the data symbol by using the received signal vector.

In another aspect of the present invention, a method for decoding a received signal by using a multi-input multi-output decoder includes: finding a poly-diagonalized matrix from an estimated channel matrix; calculating a first received signal vector, a coefficient value, and a variance value of effective noise from the poly-diagonalized matrix and a vector of the received signal; and calculating a soft decision value of the received signal by using the calculated first received signal vector, the coefficient value, and the variance value of effective noise, and decoding the received signal by using the calculated soft decision value.

According to exemplary embodiments of the present invention, since a linear preprocess is performed by using a poly-diagonalized matrix, it is possible to receive MIMO signals that have good packet error rate performance and less complexity.

Also, since the tail-biting trellis decoding method is used based on the poly-diagonalized matrix that is generated by poly-diagonalizing the effective channel matrix during the process of eliminating signal interference, a soft decision value for a symbol can be generated with a simple hardwired device and less operation complexity.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, unless explicitly described to the contrary, the word "comprising" and variations such as "comprises" will be understood to imply the inclusion of stated elements but not the exclusion of any other elements. Also, the terms "unit", "device", and "module" in the present specification represent a unit for processing a predetermined function or operation, which can be realized by hardware, software, or a combination of hardware and software.

In the specification, a mobile station (MS) may indicate a terminal, a mobile terminal (MT), a subscriber station (SS), a portable subscriber station (PSS), user equipment (UE), and an access terminal (AT), and may include entire or partial functions of the terminal, mobile terminal, subscriber station, portable subscriber station, and user equipment.

In the specification, a base station (BS) may indicate an access point (AP), a radio access station (RAS), a node B, a base transceiver station (BTS), and a mobile multihop relay (MMR)-BS, and may include entire or partial functions of the AP, RAS, node B, BTS, and MMR-BS.

Figure 1:
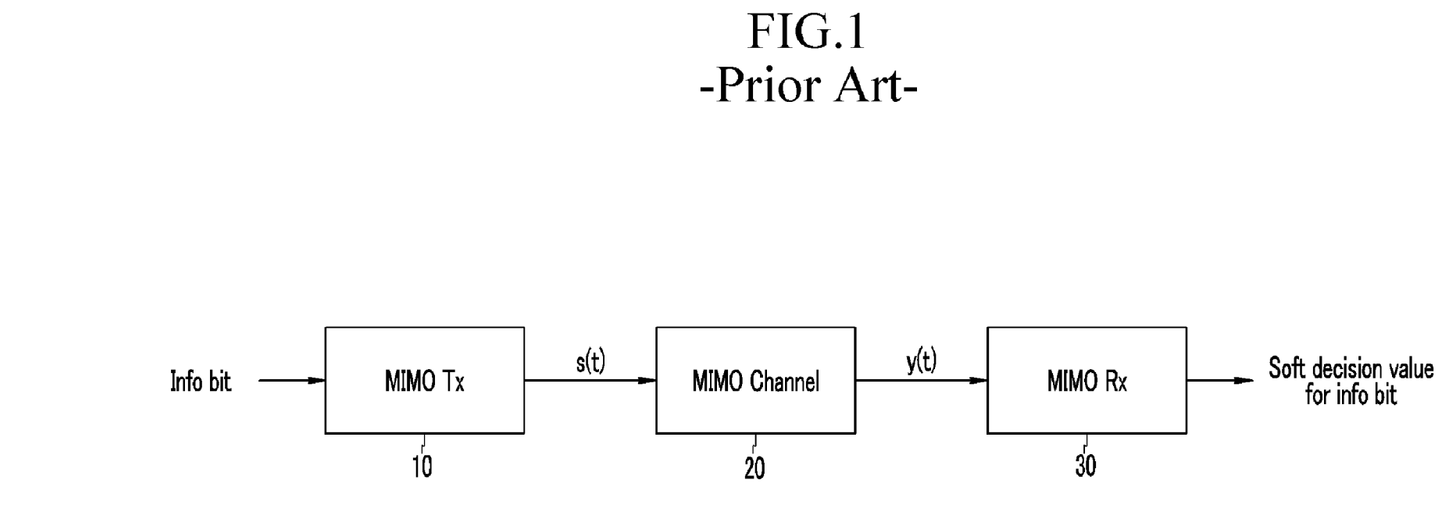
FIG. 1 is a block diagram of a general MIMO system.

FIG. 1 is a block diagram of a general MIMO system.

As shown in FIG. 1, the MIMO system includes a MIMO transmitter 10, a MIMO channel 20, and a MIMO receiver 30.

The MIMO channel 20 is an effective channel including a baseband postprocessor of the MIMO transmitter 10, an IF/RF processor, a multiple antenna channel, an RF/IF processor of a receiving part, and a baseband preprocessor, and is generally denoted as an N×M single complex matrix H. Here, M is the number of transmit antennas and N is the number of receive antennas, and the input/output of the MIMO channel 20 is defined below.

s(t): a transmission symbol vector (M×1 vector) at the t-th time y(t): a receiving symbol vector (N×1 vector) at the t-th time G: a MIMO channel matrix (N×M matrix)

The input/output of the MIMO channel 20 having M transmit antennas and N receive antennas is expressed in Equation 1.

$$y = Gs + n \quad \text{(Equation 1)}$$

where $n=[n_0, n_1, \ldots, n_{N-1}]$ is a random noise vector and is assumed as a joint Gaussian distribution of $E[n]=0$ and $E[nn^H]=\sigma^2 I$, and the data symbol vector $s=[s_0, s_1, \ldots, s_{M-1}]$ is assumed as $E[s]=0$ and $E[ss^H]=I$. The $E[\bullet]$ is an expectation value.

A configuration of the MIMO transmitter 10 will now be described with reference to FIG. 2.

Figure 2:
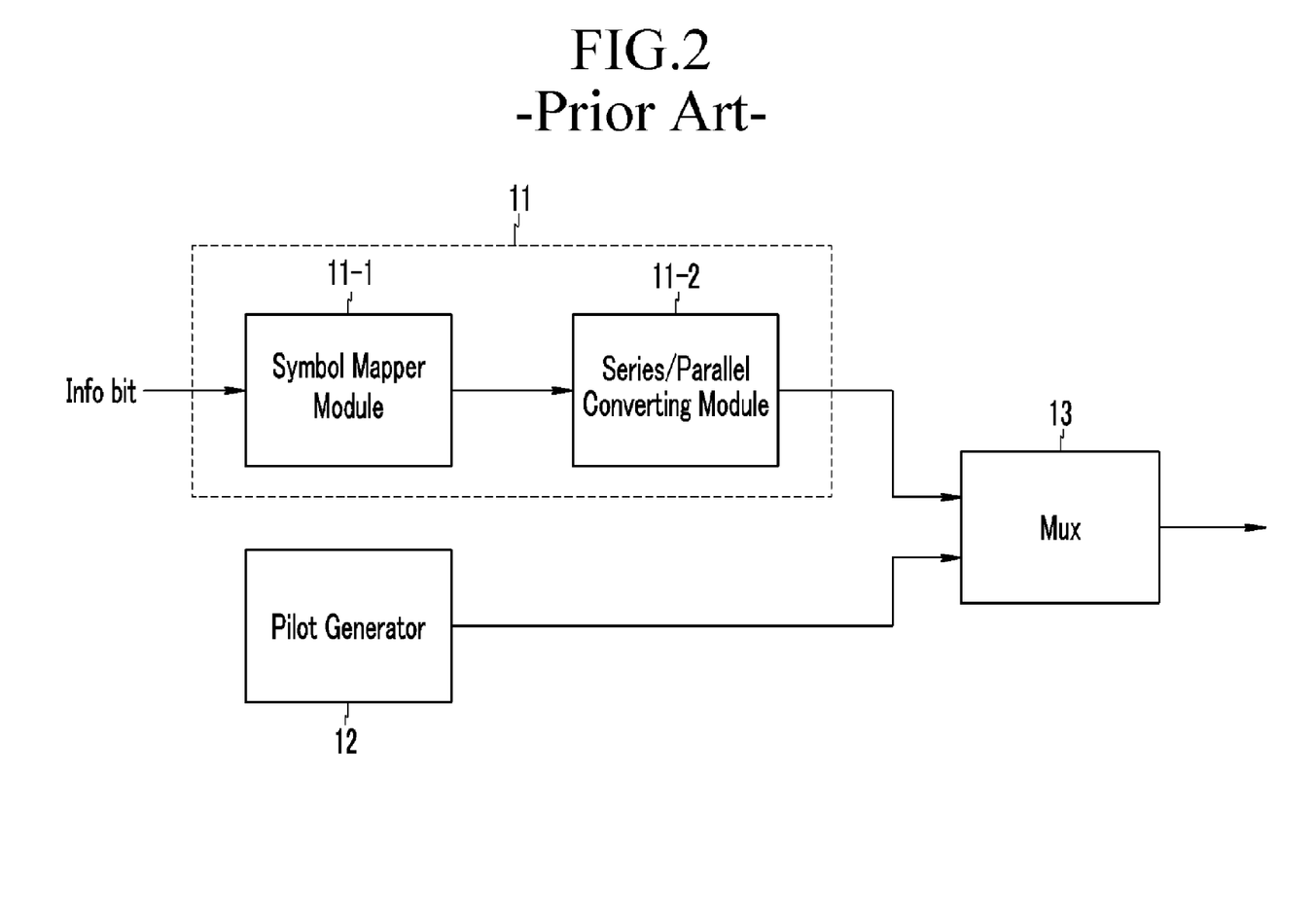
FIG. 2 is a configuration diagram of a transmitter in a general MIMO system.

FIG. 2 is a configuration diagram of a transmitter in a general MIMO system.

As shown in FIG. 2, the MIMO transmitter 10 includes a data vector generator 11, a pilot generator 12, and a multiplexer 13. Here, the data vector generator 11 includes a symbol mapper module 11-1 and a series/parallel converting module 11-2, and the data vector generated by the data vector generator 11 and the pilot vector generated by the pilot generator 12 are multiplexed by the multiplexer 13.

The pilot vector is known by the MIMO transmitter 10 and the MIMO receiver 30, and is used for channel estimation by the MIMO receiver 30. The data vector is information data generated by input information. The data vector and the pilot vector are (M×1) complex vectors, and the real part and the imaginary part thereof correspond to the in-phase component and the quadrature-phase of the digital modulator.

In general, the symbol mapper module 11-1 receives m binary information bits $(d_0, d_1, \ldots, d_{m-1}$ where $d_j \in A_b=0, 1)$, and maps the information bits on the symbol $s \in A_s$ having the in-phase components as the real part and the quadrature-phase components as the imaginary part. Here, $A_s$ is a symbol set for the symbol s having $2^m$ elements.

The data vector s including M symbols is processed as a block in the MIMO system, and a data vector s includes mM information bits since each symbol has m bits. Here, the bits included in the data vector are specified as vectors $d=[d_0, d_1, \ldots, d_{mM-1}]$, and the mapping relation between the components of d and the components of s is assumed to be $[d_{km}, d_{km+1}, \ldots, d_{km+m-1}] \leftrightarrow s_k$, $k=0, 1, \ldots M-1$.

The MIMO receiver 30 of FIG. 1 will be described with reference to FIG. 3.

Figure 3:
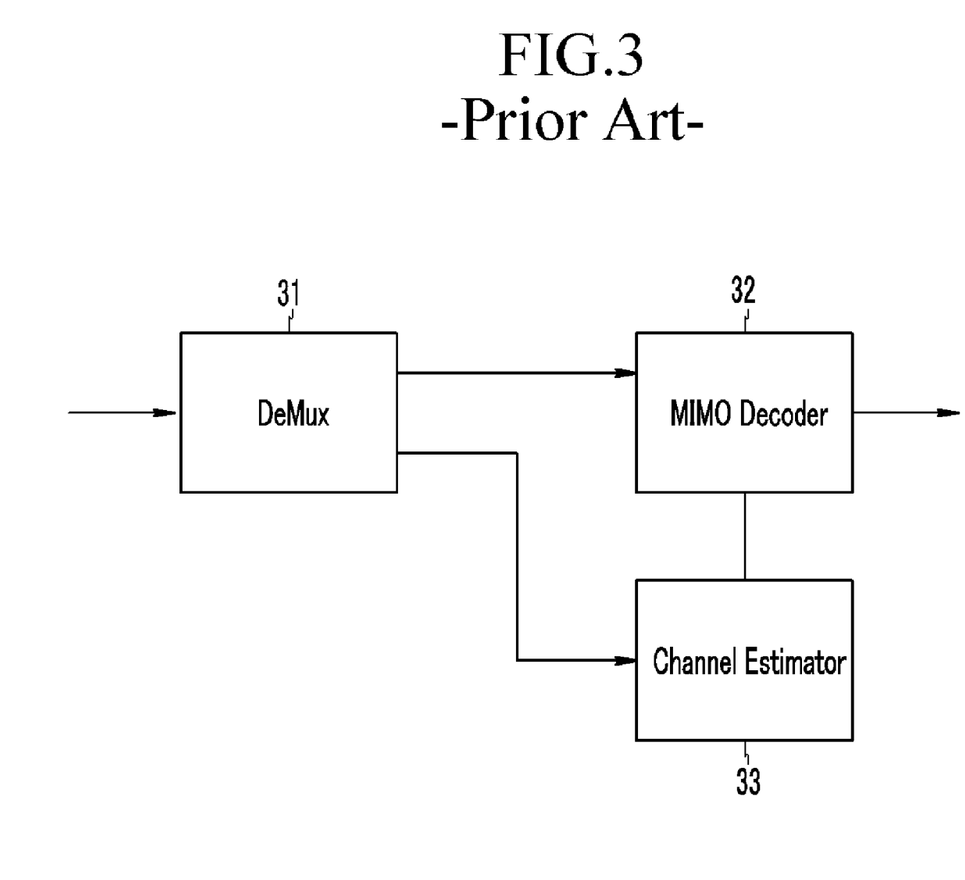
FIG. 3 is a configuration diagram of a receiver in a general MIMO system.

FIG. 3 is a configuration diagram of a receiver in a general MIMO system.

As shown in FIG. 3, the MIMO receiver 30 includes a demultiplexer 31, a MIMO decoder 32, and a channel estimator 33.

The demultiplexer 31 switches the (N×1) channel input vector r input by the MIMO channel 20 at a predetermined time to transmit the channel input corresponding to a pilot to the channel estimator 33 and the channel input corresponding to data symbol vector to the MIMO decoder 32. Here, the predetermined time represents the time when the demultiplexer 31 has received the symbol including the pilot from the transmitter. The channel estimator 33 estimates a channel matrix from the channel input vector transmitted by the demultiplexer 31, and transmits the estimated channel matrix H to the MIMO decoder 32 so as to use the same for data symbol decoding.

When the operation of the channel matrix H estimated by the channel estimator 33 is finished and transmitted to the MIMO decoder 32, the MIMO decoder 32 uses the estimated channel matrix H and the N×1 received signal vectors $y=[y_0, y_1, \ldots, y_{M-1}]$ provided by the demultiplexer 31 to calculate soft decision values $L_j$ ($j=0, 1, \ldots, mM-1$) for the respective components $d_j$ ($j=0, 1, \ldots, mM-1$) of the transmitted data bit vector d, and then outputs the soft decision values $L_j$. The calculated soft decision values are expressed as (mM×1) vectors $L=[L_1, L_2, \ldots, L_{mM}]$ in FIG. 3.

Since the complexity of the receiving part is increased when the signal is decoded by using the general MIMO transmission system, a MIMO system for reducing the complexity of the receiving part and generating a great packet error rate (PER) performance will now be described in the exemplary embodiment of the present invention. That is, interference is partially eliminated and interference is partially allowed in the exemplary embodiment of the present invention, and hence a combined decoding process is performed in consideration of the allowed interference other than reducing the amplitude of noise power in the postprocess, which will be described in detail with reference to FIG. 4.

Before the linear MIMO receiver according to an exemplary embodiment of the present invention will be described, inputs/outputs of the MIMO channel will be denoted by s and y without t that is a time variable since the inputs/outputs are processed with reference to a vector. Here, s is a transmission symbol vector (M×1 vector), and y is a received symbol vector (N×1 vector).

Figure 4:
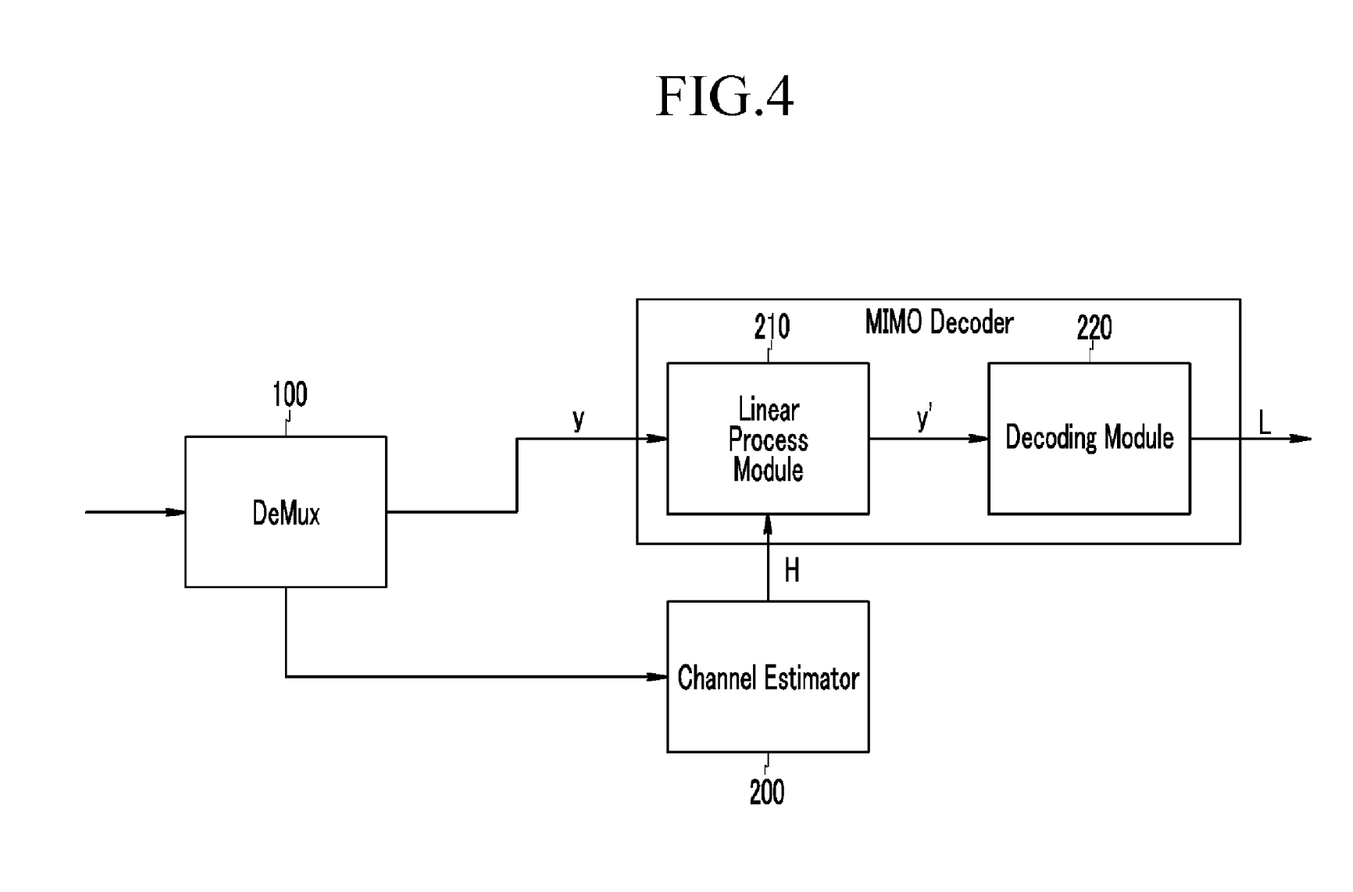
FIG. 4 is a configuration diagram of a decoder in a MIMO system according to an exemplary embodiment of the present invention.

FIG. 4 is a configuration diagram of a decoder in a MIMO system according to an exemplary embodiment of the present invention.

As shown in FIG. 4, the decoder includes a linear process module 210 and a decoding module 220.

The linear process module 210 multiplies the received signal vector y output by the demultiplexer 100 and the (M×N) poly-diagonalized matrix B that depends on the channel H estimated by the channel estimator 200 to generate a (M×1) vector y'. Here, the effect of poly-diagonalizing the equivalent channel is acquired by using the poly-diagonalized matrix B, and two methods for finding the M×N poly-diagonalized matrix B will be described in the exemplary embodiment of the present invention. The first method is poly-diagonalization based on the noise power amplification minimizing index, and the second one is poly-diagonalization based on the mutual information maximizing index, which will be described with reference to FIG. 5.

The decoding module 220 generates soft decision values for the respective bits included in the transmission symbol vector by using the received signal vector from which the interference output by the linear process module 210 is partially eliminated, a variance value of the sum of noise and interference, and a coefficient. A trellis decoding module toward the decoding module 220 is used in the exemplary embodiment of the present invention. The soft decision value generated by the decoding module 220 is used to decode the received signal that is input to the receiving part into a transmission signal.

A method for poly-diagonalizing the received signal by using the decoder of the MIMO system will now be described with reference to FIG. 5. Each calculation is illustrated to be sequentially performed in FIG. 5, and parallel calculation is also possible.

Figure 5:
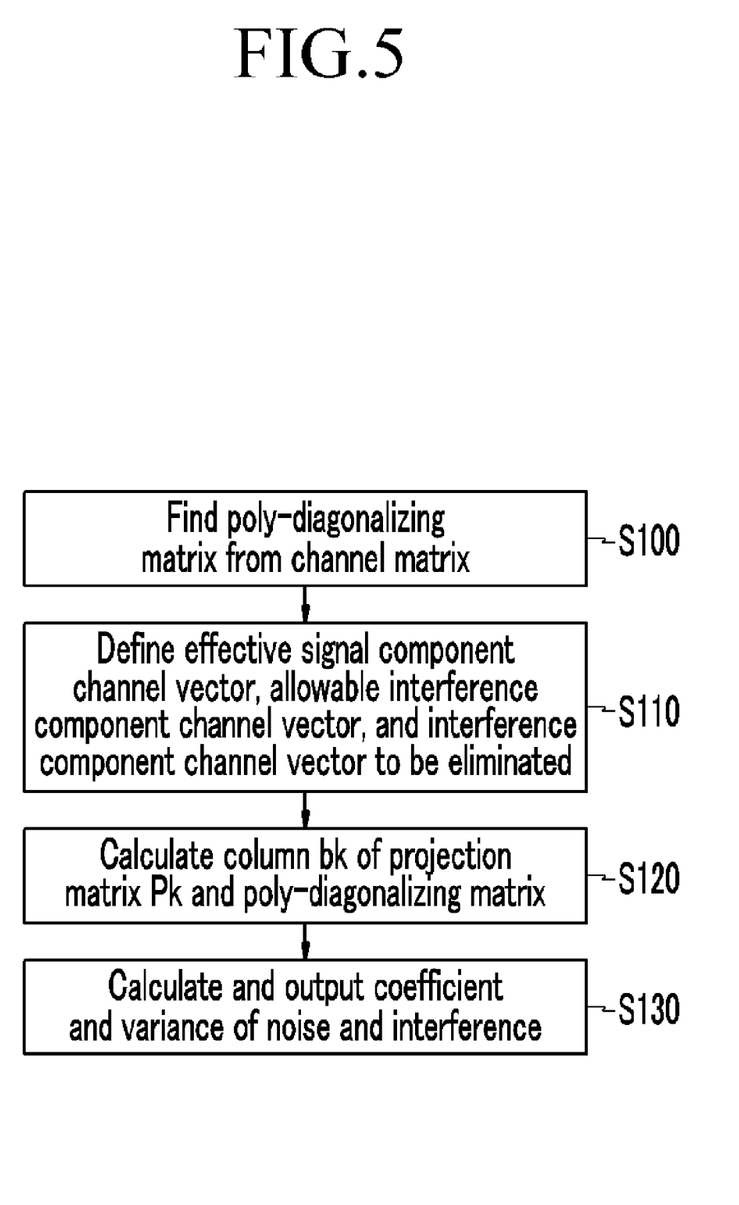
FIG. 5 is a flowchart of a poly-diagonalization method according to an exemplary embodiment of the present invention.

FIG. 5 is a flowchart of a poly-diagonalization method according to an exemplary embodiment of the present invention.

As shown in FIG. 5, regarding the poly-diagonalization method, a poly-diagonalized matrix is found from a channel matrix H for the received signal (S100), and an effective signal component channel vector, an allowable interference component channel vector, and an interference component channel vector to be eliminated are defined from the channel matrix (S110). A projection matrix $P_k$ and a specific column matrix $b_k$ of the poly-diagonalized matrix are calculated from the allowable interference component channel vector and the interference component channel vector to be eliminated (S120), and a coefficient and a variance of the sum of noise and interference are calculated from the calculated specific column matrix $b_k$ and are then output (S130). In this instance, in S120, it is possible to use the matrix $K_k$ value (shown in Equation 19) that is an addition of a product of an allowable interference component channel vector and an interference component channel vector to be eliminated to a product of a variance and a unit matrix I, other than the projection matrix.

In further detail to the poly-diagonalization method, as described in FIG. 4, two methods for finding the poly-diagonalized matrix that is an M×M matrix B will be described in the exemplary embodiment of the present invention. The first method is the poly-diagonalization method based on the noise power amplification minimizing index, and the second one is the poly-diagonalization method based on the mutual information maximizing index.

Regarding the poly-diagonalization method based on the noise power amplification minimizing index, the (L+1)-th order poly-diagonalized matrix can be configured with (L+1) m×m diagonal matrixes. $D_l$=diag[$a_{0l}$, $a_{1l}$, ..., $a_{(M-1)l}$], l=0, 1, 2, ..., L is assumed to be (L+1) M×M diagonal matrixes, and the matrix $D_l^{(j)}$ is acquired by column-rotating $D_l$ to the left j times. The (L+1)-th order poly-diagonalized matrix can be defined as the matrix E expressed in Equation 2.

$$E = \sum_{l=0}^{L} D_l^{(l)} \quad \text{(Equation 2)}$$

Here, the rows and columns of the matrix E (poly-diagonalized matrix) have (L+1) components other than 0.

The poly-diagonalized matrix B for a random matrix H is defined by multiplying a Hermitian transpose of B and an estimate matrix H of the real channel matrix and controlling the multiplication result to be a poly-diagonalized format.

The poly-diagonalized matrix B for the estimate matrix H of the channel matrix is defined to be a matrix that satisfies Equation 3 for (L+1) random diagonal matrixes $D_l$, l=0, 1, 2, ..., L.

$$B^H H = \sum_{l=0}^{L} D_l^{(l)} = E \quad \text{(Equation 3)}$$

Here, $B^H$ is the Hermitian transpose of the matrix B, and l of $D_l$ is the l-th diagonal component.

Equation 3 can be expressed by the k-th column $b_k$ of the poly-diagonalized matrix B and the k-th column $h_k$ of the estimate matrix of the channel matrix, as shown in Equation 4.

$$b_k^H h_{(k-l)M} = \begin{cases} a_{kl} & \text{for } l = 0, 1, 2, \ldots, L \\ 0 & \text{for } l = L+1, \ldots, M-1 \end{cases} \quad \text{(Equation 4)}$$

Here, (•)M represents a modulo-M process.

The linear process module 210 multiplies the poly-diagonalized matrix B and a received signal vector y to generate a received signal vector from which interference is partially removed as expressed in Equation 5, and transmits the received signal vector to a trellis decoder, that is, the decoding module 220. In this instance, when the receiving part is assumed to have perfect channel estimation performance (i.e., H=G), the received signal vector from which interference is partially removed is obtained as expressed in Equation 6.

$$y' = B^H y \quad \text{(Equation 5)}$$

$$y' = B^H H s + B^H n = Es + B^H n \quad \text{(Equation 6)}$$

In this instance, when it is defined that $n'_k = b_k^H n$, Equation 6 is expressed as Equation 7, and $y'_k$ represents the k-th component of the poly-diagonalized received signal vector.

$$y'_k = b_k^H y \quad \text{(Equation 7)}$$
$$= a_{k0} s_k + \sum_{l=0}^{L} a_{kl} s_{(k-l)M} + n'_k$$
$$\text{for } k = 0, 1, 2, \ldots, M-1$$

Here, the average of the noise component $n'_k$ is 0, and the variance is $E|n'_k|^2 = \sigma_5^2 = \sigma^2 b_k^H b_k$.

When the tail-biting trellis is applied to the poly-diagonalized channel (which will be described later), the soft decision values of the symbols $s_k$ can be generated with relatively simple hardware and less operation complexity.

Since the respective components $a_{kl}$ of the diagonal matrix $D_l$, $l=0, 1, 2, \ldots, L$ can have a random value in Equation 3, there can be a lot of matrixes B that satisfy Equation 3. Therefore, in order to acquire a further meaningful poly-diagonalized matrix B, an additional constraint is required. In the exemplary embodiment of the present invention, the additional constraint is used so as to maximize the signal-to-noise ratio (SNR) expressed in Equation 8.

$$SNR_k \equiv |b_k^H h_k|^2 / |b_k^H b_k|^2 \quad \text{(Equation 8)}$$

That is, when it is defined that $T_k \equiv L+1, L+2, \ldots, M-1$, the solution $b_k$ of Equation 9 can be found by using the projection matrix.

$$b_k = \underset{b: b^H h_{(k-l)_M}=0 \text{ for } l \in T_k}{\arg\max} \frac{|b^H h_k|^2}{b^H b} \quad \text{(Equation 9)}$$

$$k = 0, 1, 2, \ldots, M-1$$

In order to acquire $b_k$ in Equation 9, the channel matrix H is divided into 3 sub-matrixes. The 3 sub-matrixes are $h_k$, $\hat{H}_k$, and $\overline{H}_k$ respectively, and represent a channel vector of an effective signal component of $b_k$, and sub-channel matrixes of an allowable interference component and an interference component to be eliminated. The 3 sub-matrixes satisfy the condition of Equation 10.

$$HH^H = h_k h_k^H + \hat{H}_k \hat{H}_k^H \overline{H}_k \overline{H}_k^H \quad \text{[Equation 10]}$$

When the channel H has a full rank, it is apparently given that $\text{rank}(\overline{H}_k)=M-L-1$ and $\text{rank}(\hat{H}_k)=L$. Also, $b_k^H \overline{H}_k=0$ is satisfied from the condition of Equation 4, and 0 is an M×1 zero vector having all the components of 0.

The projection matrix $P_k$ of $b_k$ is defined as expressed in Equation 11, and projects a vector into the vector space configured by the column vector of $\overline{H}_k$.

$$P_k = \overline{H}_k (\overline{H}_k^H \overline{H}_k)^{-1} \overline{H}_k^H \quad \text{[Equation 11]}$$

Therefore, Equation 11 is equivalent to $P_k b_k=0$ when the condition $b^H h_{(k-l)_M}=0$ for $l \in T$ of Equation 9 is given, and it also corresponds to $(I-P_k)b_k=b_k$. Therefore, Equation 9 can be redefined as Equation 12.

$$b_k = \underset{b_k: P_k b_k=0}{\arg\max} \frac{|b^H h_k|^2}{b^H b} = \underset{b:(I-P_k)b=b}{\arg\max} \frac{|b^H h_k|^2}{b^H b}$$

$$= \underset{b_k}{\arg\max} \frac{b^H(I-P_k)h_k h_k^H(I-P_k)b}{b^H b} \quad \text{(Equation 12)}$$

The solution of Equation 12 for a random complex constant $c_k$ is expressed in Equation 13.

$$b_k = c_k(I-P_k)h_k \, k=0,1,2,\ldots,M-1 \quad \text{[Equation 13]}$$

By using Equation 13, the respective coefficients of Equation 7 are defined as Equation 14, and the variance of noise $n'_k = b_k^H n$ is defined as Equation 15.

$$a_{kl} = c_k h_k^H (I-P_k) h_{(k-l)_M}, k=0,1,2,\ldots,M-1 \quad \text{[Equation 14]}$$

$$\sigma_k^2 = E[|n'_k|^2] = c_k|^2 h_k^H(I-P_k)(I-P_k)h_k, k=0,1,2,\ldots,M-1 \quad \text{[Equation 15]}$$

The poly-diagonalization method based on the noise power amplification minimizing index has been described from among the methods for finding the poly-diagonalized matrix, and the second poly-diagonalization method according to the mutual information maximizing index will now be described. The poly-diagonalization method according to the mutual information maximizing index indicates a pseudo poly-diagonalization method.

In a like manner of the above description, the channel matrix H is divided into a channel vector $h_k$ of an effective signal component, a sub-channel matrix of an allowable interference component, and a sub-channel matrix $\overline{H}_k = [h_{(k-M+1)_M}, \ldots, h_{(k-L-1)_M}]$ of an interference component to be eliminated. The 3 sub-matrixes satisfy the condition of Equation 10.

When the channel matrix H has a full rank, it is apparently given that $\text{rank}(\overline{H}_k)=M-L-1$ and $\text{rank}(\hat{H}_k)=L$.

In a similar manner, the data symbol vector s is also divided into 3 components. That is, s is divided into $s_k$, $\hat{s}_k$, and $\overline{s}_k$, which respectively represent a data symbol of an effective signal component, a data symbol vector of an (L×1) allowable interference component, and a data symbol vector of an (M−L−1)×1 interference component to be eliminated.

The matrix for the pseudo poly-diagonalization will be called B, and the received signal from which interference is partially eliminated is defined in Equation 16.

$$y' = B^H y \quad \text{[Equation 16]}$$

Here, Equation 17 is given when the k-th column vector of the poly-diagonalized matrix B is set to be $b_k$ and Equation 16 is rewritten for the respective components.

$$y'_k = b_k^H y \quad \text{(Equation 17)}$$

$$= \underbrace{b_k^H h_k s_k}_{\substack{\text{Effective} \\ \text{signal} \\ \text{component}}} + \underbrace{b_k^H \hat{H}_k \hat{s}_k}_{\substack{\text{Allowable} \\ \text{interference} \\ \text{component}}} + \underbrace{b_k^H \overline{H}_k \overline{s}_k}_{\substack{\text{Interference} \\ \text{component to be} \\ \text{eliminated}}} + b_k^H n$$

$$= \underbrace{a_{k0} s_k}_{\substack{\text{Effective} \\ \text{signal} \\ \text{component}}} + \underbrace{\sum_{l=1}^{L} a_{kl} s_{(k-l)_M}}_{\substack{\text{Allowable} \\ \text{interference} \\ \text{component}}} + \underbrace{\sum_{l=L+1}^{M-1} a_{kl} s_{(k-l)_M}}_{\substack{\text{Interference} \\ \text{component to be} \\ \text{eliminated}}} + n_k$$

for $k = 0, 1, 2, \ldots, M-1$ $$= \underbrace{a_{k0} s_k}_{\substack{\text{Effective} \\ \text{signal} \\ \text{component}}} + \underbrace{\sum_{l=1}^{L} a_{kl} s_{(k-l)_M}}_{\substack{\text{Allowable} \\ \text{interference} \\ \text{component}}} + n'_k$$

Here, the effective signal component can be defined as Equation 18.

$$a_{kl} = b_k^H h_{(k-l)_M} \quad \text{[Equation 18]}$$

Also, the noise component is defined as $n_k = b_k^H n$, and the sum of the noise and the interference component to be eliminated is defined to be $$n'_k = b_k^H \overline{H}_k \overline{s}_k + b_k^H n = \sum_{l=L+1}^{M-1} a_{kl} s_{(k-l)_M} + n_k.$$

Assuming that the noise vector n is given as $E[n]=0$, $E[nn^H]=\sigma^2 I$, the data symbol vector s is given as $E[s]=0$, $E[ss^H]=I$, and n and s are statistically independent, $E[n'_k]=0$ and $E[|n'_k|^2]=b_k^H K_k b_k$ are satisfied for the sum $n'_k$ of the noise and the interference component to be eliminated. Here, $K_k$ is expressed in Equation 19.

$$K_k = \overline{H}_k \overline{H}_k^H + \sigma^2 I \quad \text{[Equation 19]}$$

The k-th column vector $b_k$ of the pseudo poly-diagonalized matrix B is defined as the solution of the optimization problem of Equation 20.

$$b_k = \underset{b \in C^M}{\operatorname{argmax}} \left( \frac{b^H h_k h_k^H b}{b^H K_k b} \right) \quad \text{(Equation 20)}$$

$$k = 0, 1, 2, \ldots, M-1$$

The solution of Equation 20 is given as Equation 21 for a random complex constant $c_k$.

$$b_k = c_k K_k^{-1} h_k \; k=0,1,2,\ldots,M-1 \quad \text{[Equation 21]}$$

The solution given as Equation 21 approaches the solution of Equation 13 as the background noise power $\sigma^2$ becomes 0 ($\sigma^2 \to 0$). The respective coefficients of Equation 17 can be expressed as Equation 22 by using Equation 21, and the variance of the sum of noise and the interference to be removed is expressed as Equation 23.

$$a_{kl} = c_k h_k^H K_k^{-1} h_{(k-l)_M} \; k=0,1,2,\ldots,M-1 \quad \text{[Equation 22]}$$

$$\sigma_k^2 = E[|n'_k|^2] = c_k|^2 h_k^H K_k^{-1} h_k \; k=0,1,2,\ldots,M-1 \quad \text{[Equation 23]}$$

The received signal vector y' from which interference is partially removed, the coefficient value, and the variance of the sum of noise and interference are input to the trellis decode module and are used for finding the soft decision values of the respective transmission bits. A method for finding a soft decision value for each bit by using the tail-biting trellis will now be described with reference to FIG. 6.

Figure 6:
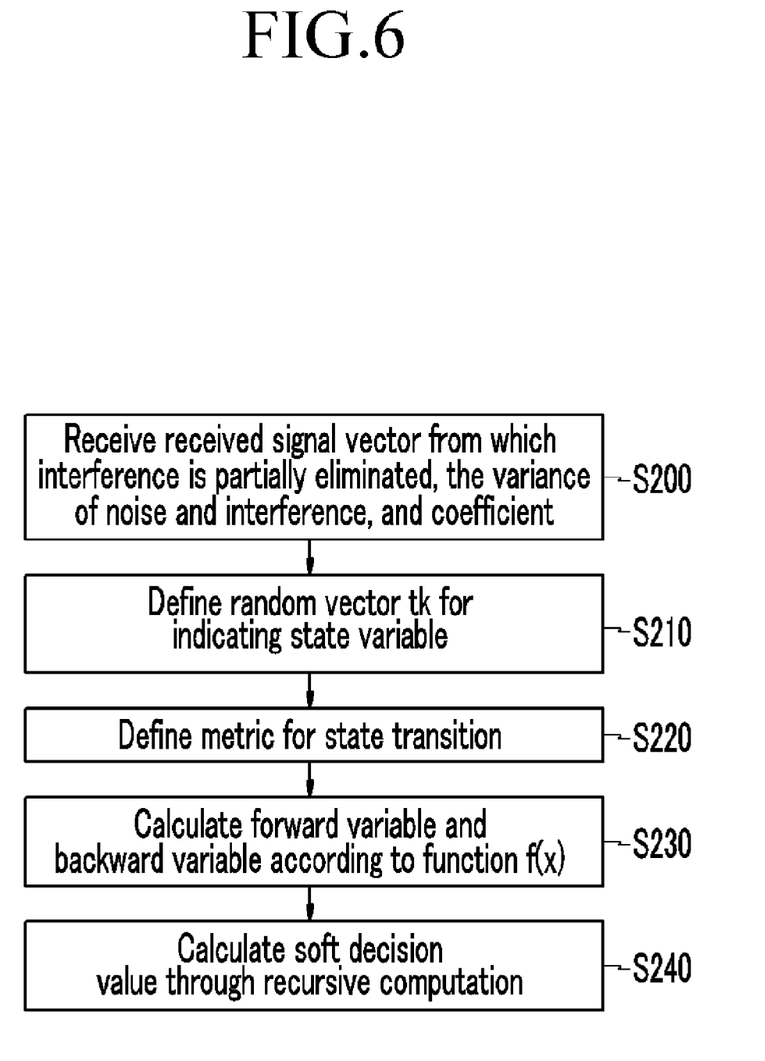
FIG. 6 is a flowchart for finding a soft decision value for each bit according to an exemplary embodiment of the present invention.

FIG. 6 is a flowchart for finding a soft decision value for each bit according to an exemplary embodiment of the present invention.

As shown in FIG. 6, the decoding module 220 finds the soft decision vector $L=[L_1, L_2, \ldots, L_{mM}]$ for the transmitted data bit vector d by using the result of the linear process module 210. In detail, the decoding module 220 receives the received signal vector y', from which interference is partially eliminated, is acquired from the linear preprocess of the linear process module 210, the variance value $\{\sigma_k^2; k=0, 1, \ldots, M-1\}$ of the sum of noise and interference included therein, and the coefficient value $\{a_{kl}; k=0, 1, \ldots, M-1, l=0, 1, \ldots, L\}$ (S200). The decoding module 220 defines a random vector tk for indicating a state variable of the transmission symbol vector s (S210), and defines a metric for a state transition (S220). The decoding module 220 calculates a forward variable and a backward variable according to the function f(x) included in the metric (S230), and calculates the soft decision value $L_j$ for each bit included in the transmission symbol vector s of the received signal (S240) by performing a recursive operation on the forward variable and the backward variable.

The above-described trellis decoding method is well known to a person skilled in the art. The decoding module 220 according to the exemplary embodiment of the present invention performs the decoding process by using the linear preprocess result of the linear process module 210, and hence the tail-biting trellis decode that is a trellis decoding method will be described.

A trellis is expressed by a node for indicating a specific state at a level and a branch for indicating a specific state transition. In order to describe the process of the decoding module 220, the L×1 state vector $t_k = [t_{k,0}, t_{k,l}, \ldots, t_{k,L-1}]^T$ for indicating the state variable of the k-th trellis stage will be defined as the vector $[s_{(k)_M}, s_{(k-1)_M}, \ldots, s_{(k-L+1)_M}]^T$ corresponds to the partial block of the transmission symbol vector s as expressed in Equation 24.

$$t_k = [t_{k,0}, t_{k,1}, \ldots, t_{k,L-1}]^T = [s_{(k)_M}, s_{(k-1)_M}, \ldots, s_{(k-L+1)_M}] \quad \text{[Equation 24]}$$
$$k=0,1,2,\ldots,M-1$$

Here, it is given that $t_{k,j} \in A_s$ and $t_k \in A_s^M$.

Equation 25 can be defined in the case of $t_{k-1}$.

$$t_{(k-1)_M} = [s_{(k-1)_M} s_{(k-2)_M} \ldots, s_{(k-L)_M}] \; k=0,1,2,\ldots,M-1 \quad \text{[Equation 25]}$$

It is known that Equation 26 is given from Equation 25 for $j=1, 2, \ldots, L-1$.

$$t_{k,j} = t_{(k-1),(j-1)} \quad \text{[Equation 26]}$$

A set of all state vector pairs (t,t') for satisfying the condition of Equation 26 that the random vector pair $(t_k, t_{(k-1)_m})$ may have will be defined as T.

Here, $t=[t_0, t_1, \ldots, t_{L-1}]^T$, $t'=[t'_0, t'_1, \ldots, t'_{L-1}]^T$. Also, the metric $\gamma_k(t,t')$ for the state transition (t,t') in the k-th trellis stage is defined as Equation 27.

$$\gamma_k(t, t') = f\left( \frac{\left| y'_k - a_{kl} t_0 \sum_{l=1}^{L} a_{kl} t_{l-1} \right|^2}{\sigma_k^2} \right) \quad \text{(Equation 27)}$$

Here, f(x) is a monotonic decrement or increment function for the variable x. Also, $\gamma'_k$, $a_{kl}$ and $\sigma_k^2$ can be calculated by Equation 7, Equation 14, and Equation 25 when they are linked with the linear process module 210 that follows the poly-diagonalization method based on the noise power amplification minimizing index from among the poly-diagonalization methods described with reference to FIG. 5. The same can be calculated by Equation 17, Equation 22, and Equation 23 when they follow the poly-diagonalization method according to the mutual information maximizing index.

A forward variable $\alpha_k(t)$ and a backward variable $\beta_k(t)$ are defined with the metric that is related to the state of each trellis state. The variables are reset with a predetermined value, and a recursive computation is performed thereon to acquire desired values. Here, the recursive computation is changed depending on whether the function f(x) of Equation 27 is a monotonic decrement function or a monotonic increment function for x. When the function f(x) is a monotonic decrement function for x, Equation 28 and Equation 29 are given, and when it is a monotonic increment function, Equation 30 and Equation 31 are given.

$$\alpha_k(t) = \max_{t':(t,t') \in T} [\gamma_k(t,t') + \alpha_{k-1}(t')] \quad \text{(Equation 28)}$$

for $k = 0, 1, 2, \ldots, M-1$ $$\alpha_0(t) = \max_{t':(t,t') \in T} [\gamma_0(t,t') + \alpha_{M-1}(t')]$$

$$\beta_k(t) = \max_{t':(t,t') \in T} [\gamma(t',t) + \beta_{k+1}(t')] \quad \text{(Equation 29)}$$

for $k = 0, 1, 2, \ldots, M-2$ $$\beta_{M-1}(t) = \max_{t':(t,t') \in T} [\gamma(t',t) + \beta_0(t')]$$

$$\alpha_k(t) = \min_{t':(t,t') \in T} [\gamma_k(t,t') + \alpha_{k-1}(t')] \quad \text{(Equation 30)}$$

for $k = 0, 1, 2, \ldots, M-1$ $$\alpha_0(t) = \min_{t':(t,t') \in T} [\gamma_0(t,t') + \alpha_{M-1}(t')]$$

-continued $$\beta_k(t) = \min_{t':(t,t')\in T} [\gamma(t', t) + \beta_{k+1}(t')] \quad \text{(Equation 31)}$$

for $k = 0, 1, 2, \ldots, M-2$ $$\beta_{M-1}(t) = \min_{t':(t,t')\in T} [\gamma(t', t) + \beta_0(t')]$$

When the recursive computation is performed, decision values $L_j$ for the data bits $d_j$ are calculated from the forward variable $\alpha_k(t)$ and the backward variable $\beta_k(t)$. To achieve them, the metric value for the k-th data symbol $s_k$ is defined as expressed in Equation 32.

$$R_k(s) = \sum_{t:t_0=s} \alpha_k(t) + \beta_k(t) \quad \text{(Equation 32)}$$

Here, it is given that $t=[t_0, t_1, \ldots, t_{L-1}]^T \in A_s^L$ and $s \in A_s$.

Since the symbol mapper provided at the transmitting part maps m bits $(d_0, d_1, \ldots, d_{m-1})$ on a symbol s that is matched 1 by 1, the function $D_j(s)$, $j=0, 1, \ldots, m-1$ of a is defined as $D_j(s)=d_j$. By using this, the process for acquiring the soft decision values $L_j$ for the data bits $d_j$, $j=0, 1, \ldots, mM-1$ can be expressed as Equation 33.

$$L_{km+j} = a \cdot \left( \sum_{s:D_j(s)=0} R_k(s) - \sum_{s:D_j(s)=1} R_k(s) \right) \quad \text{(Equation 33)}$$

$k = 0, 1, 2, \ldots, M, j = 0, 1, \ldots, m$

Here, a is a constant.

The soft decision values $L_j$ are used to decode the received signal that is input to the receiving part into a transmission signal.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A decoding device comprising:
a demultiplexer for demultiplexing a received signal including a pilot and a data symbol, and outputting the pilot and the data symbol;
a channel estimator for receiving the pilot from the demultiplexer, estimating a channel of the received signal, and outputting a channel matrix; and
a multi-input multi-output (MIMO) decoder for outputting a received signal vector from the data symbol provided by the demultiplexer, and generating a soft decision value based on the received signal vector, and
wherein the MIMO decoder includes a linear process module for outputting the received signal vector from the data symbol that is output by the demultiplexer by using a poly-diagonalized matrix corresponding to the channel matrix estimated by the channel estimator, and a decoding module for generating the soft decision value for the data symbol by using the received signal vector, wherein the generating of the soft decision value is by using a first received signal vector, a coefficient value, and a variance value of effective noise calculated based on the poly-diagonalized matrix and the received signal vector.

2. The decoding device of claim 1, wherein the received signal vector is a received signal vector from which interference is partially eliminated.

3. The decoding device of claim 1, wherein the decoding module is a trellis decoding module for generating the soft decision value by using a tail-biting trellis.

4. A method for decoding a received signal by using a multi-input multi-output decoder, the method comprising:
finding a poly-diagonalized matrix from an estimated channel matrix; calculating a first received signal vector, a coefficient value, and a variance value of a sum of noise and interference from the poly-diagonalized matrix; and
calculating a soft decision value of the received signal by using the calculated first received signal vector, the coefficient value, and the variance value, and decoding the received signal by using the calculated soft decision value.

5. The method of claim 4, wherein the step of finding a poly-diagonalized matrix further includes finding a vector for a specific column of the poly-diagonalized matrix, and the step of finding a vector for a specific column includes: defining an effective signal component channel vector, a first interference component channel matrix, and a second interference component channel matrix from the channel matrix; and finding a vector for a specific column of the poly-diagonalized matrix from the defined effective signal component channel vector, the first interference component channel matrix, and the second interference component channel matrix.

6. The method of claim 5, wherein the first interference component channel matrix is an allowable interference component channel matrix, and the second interference component channel matrix is an interference component channel matrix to be eliminated.

7. The method of claim 5, wherein a projection matrix is calculated from the second interference component channel matrix.

8. The method of claim 7, wherein the vector for a specific column in the poly-diagonalized matrix is calculated by multiplying a value that is generated by subtracting the projection matrix from a unit matrix by a specific column value of the channel matrix.

9. The method of claim 8, wherein the variance value is calculated as a product of a Hermitian transpose of the vector for the specific column of the estimated channel matrix and a value that is generated by subtracting the projection matrix from the unit matrix.

10. The method of claim 5, wherein the vector for a specific column in the poly-diagonalized matrix is calculated by multiplying a specific column value of the channel matrix and an inverse matrix of a matrix that is an addition of a product of the second interference component channel matrix and a Hermitian transpose value to a product of the variance value and a unit matrix.

11. The method of claim 8, wherein the variance value is determined by a product of a Hermitian transpose value of a vector of a specific column of the estimated channel matrix, a vector for a specific column, and of an inverse matrix of a matrix that is an addition of a product of the second interference component channel matrix and a Hermitian transpose value to a product of a variance value and the unit matrix.

12. The method of claim 4, wherein the first received signal vector is a product of the channel matrix and the poly-diagonalized matrix.

13. The method of claim 4, wherein the coefficient value is in a specific column of the estimated channel matrix and a Hermitian transpose of a specific column of the poly-diagonalized matrix.

14. The method of claim 4, wherein the step of decoding includes:
   receiving the first received signal vector, the coefficient value, and the variance value of the sum of noise and interference, and generating a transmission symbol vector corresponding to the received signal by using the coefficient value, and the variance value of the sum of noise and interference;
   defining a state vector corresponding to a block of the generated transmission symbol vector; finding a metric for the transmission symbol vector from the state vector;
   finding a forward variable and a backward variable according to a function of a specific variable included in the metric; and
   calculating the soft decision value from the forward variable and the backward variable.

15. The method of claim 14, wherein the forward variable and the backward variable are expressed by one of a monotonic decrement function and a monotonic increment function according to the function of the specific variable.

* * * * *